United States Patent [19]
Steffl

[11] Patent Number: 5,939,105
[45] Date of Patent: Aug. 17, 1999

[54] DEVICE FOR LAYING A PLASTIC FILM ON A ROLLER

[75] Inventor: Manfred Steffl, Grassau, Germany

[73] Assignee: Bruckner Maschinenbau GmbH, Siegsdorf, Germany

[21] Appl. No.: 08/983,313

[22] PCT Filed: Apr. 25, 1997

[86] PCT No.: PCT/EP97/02148

§ 371 Date: Jan. 6, 1998

§ 102(e) Date: Jan. 6, 1998

[87] PCT Pub. No.: WO97/43107

PCT Pub. Date: Nov. 20, 1997

[30] Foreign Application Priority Data

May 9, 1996 [DE] Germany .......................... 196 18 716

[51] Int. Cl.⁶ ........................................................ B29D 7/01
[52] U.S. Cl. ........................................................ 425/377
[58] Field of Search .................................. 425/223, 224, 425/325, 326.1, 377

[56] References Cited

U.S. PATENT DOCUMENTS 3,597,515  8/1971  Widiger ................................ 264/556
4,255,365  3/1981  Heyer .................................. 264/468
5,437,546  8/1995  Dupraz ................................ 425/223

FOREIGN PATENT DOCUMENTS 595737    5/1994  European Pat. Off. .
23 11 576  9/1973  Germany .
21 14 846 C2  4/1983  Germany .

OTHER PUBLICATIONS

Patent Abstract of Japan vol. 095, No. 002, Mar. 31, 1995 & JP 06 328464 A, Nov. 29, 1994.

*Primary Examiner*—Leo B. Tentoni
*Attorney, Agent, or Firm*—Nixon & Vanderhye

[57] ABSTRACT

A device for laying a plastic film on a roller (7), especially a molten plastic film on a drying roller (7), with an air squeegee (15) having an air outlet aperture (25) extending transversely above the foil web (1), is integrated into the air squeegee (15) for edge blowing and is arranged in such a way that a common shared effective pressure application line is produced, and/or the air outlet apertures (27) of the air squeegee (15) can be adjusted along said air squeegee (15) and thus to differing effective widths across the foil web.

14 Claims, 3 Drawing Sheets

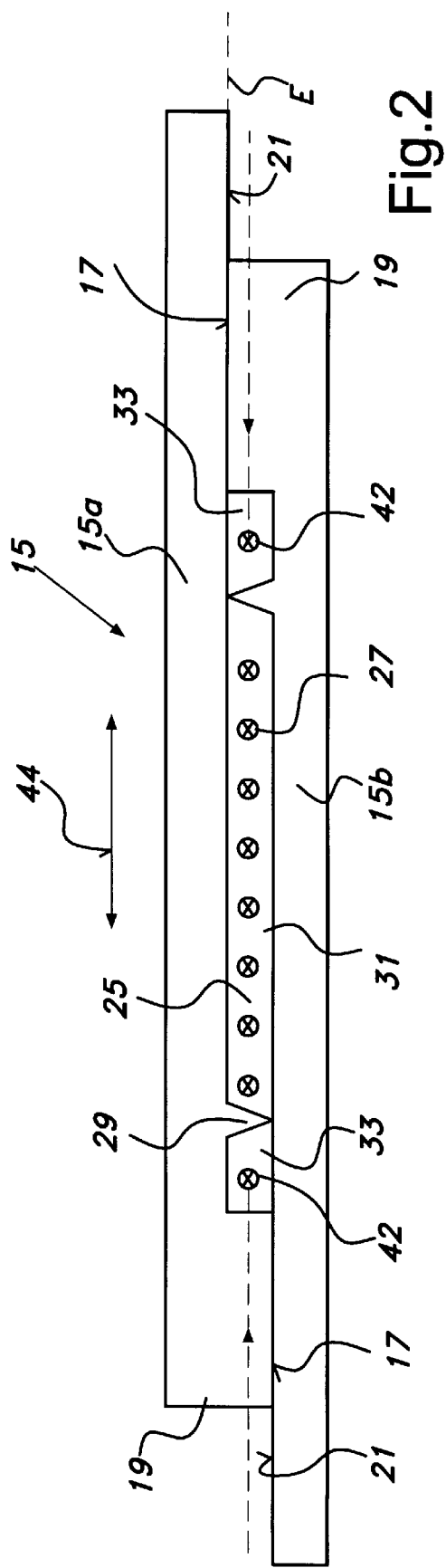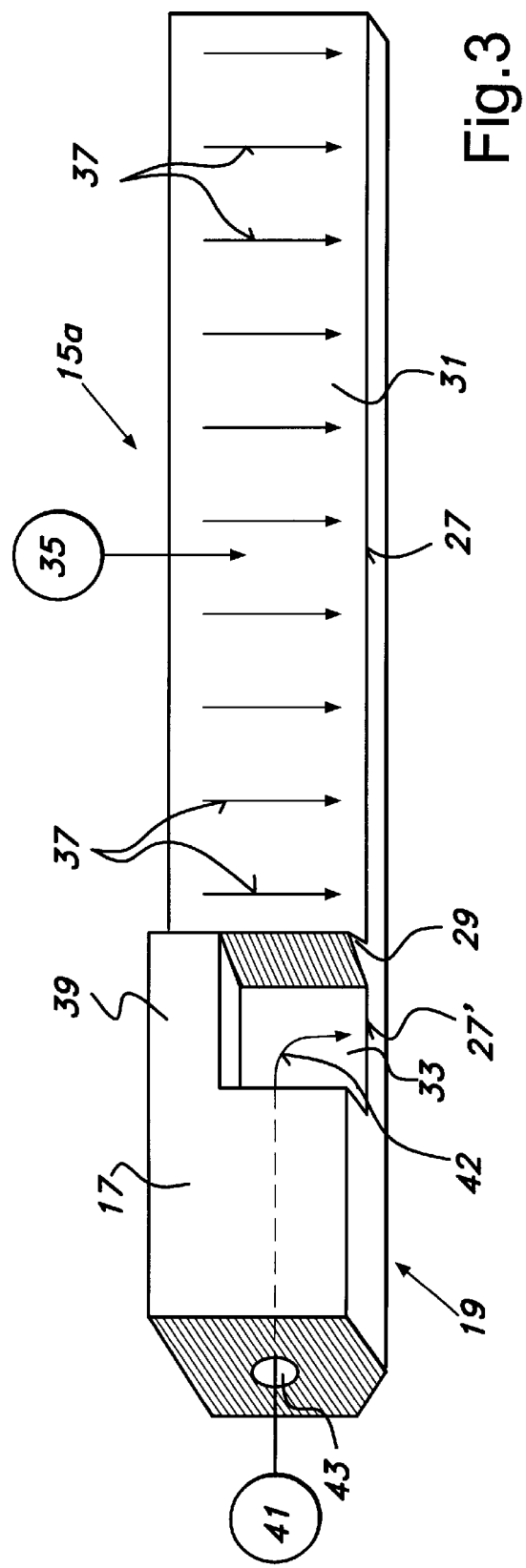

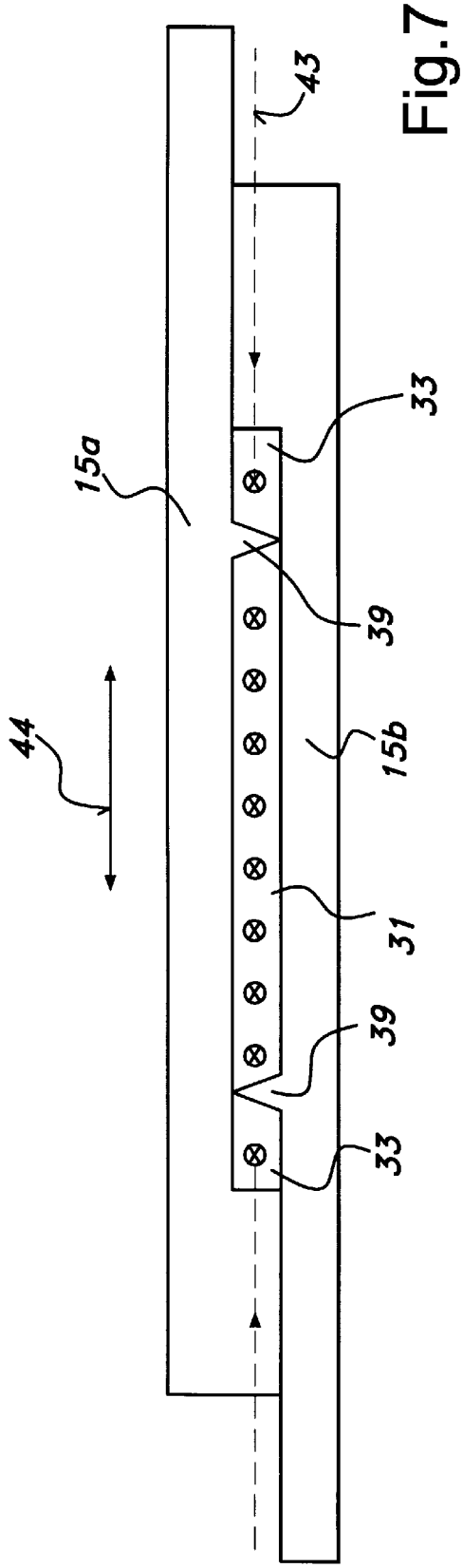
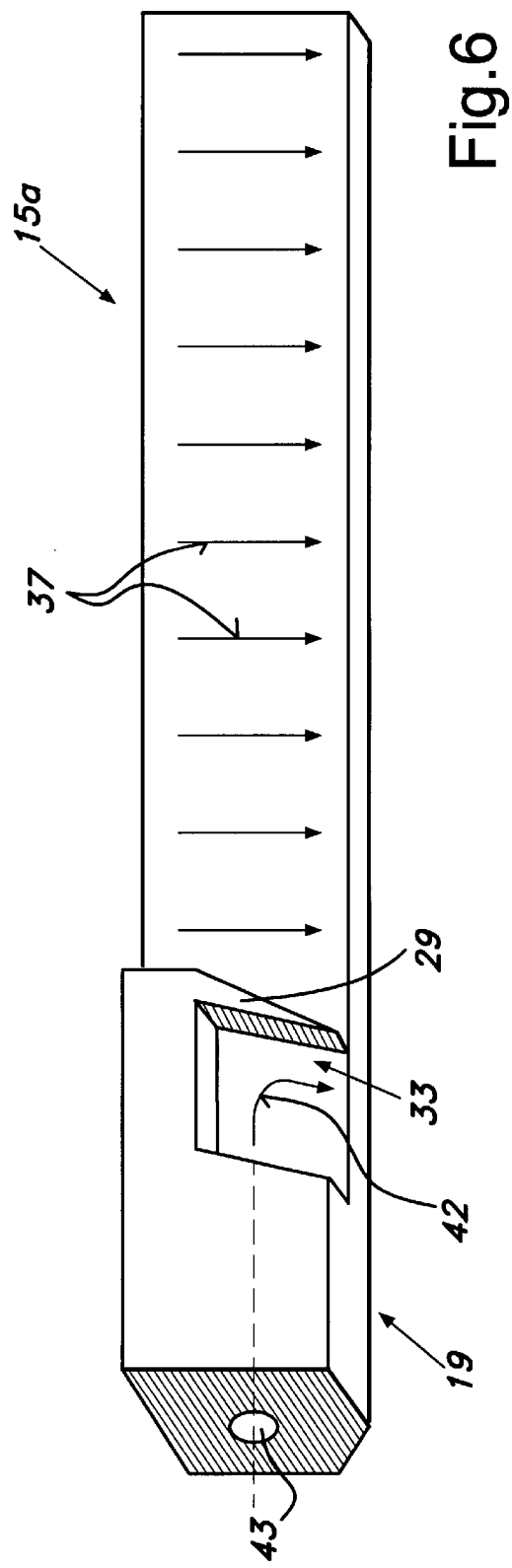

DEVICE FOR LAYING A PLASTIC FILM ON A ROLLER

BACKGROUND OF THE INVENTION

The invention relates to an apparatus for laying a plastic film on a roll, in particular for laying a polymer melt film on a chill roll.

In the production of plastic films, it is basically usual to press the melt film emerging from a slot dye onto a chill roll by means of a so-called air knife, whilst producing an adequate air velocity (dynamic pressure). In this case, the air knife extends in its longitudinal direction transversely over the width of the melt film, that is to say transversely to the take-off direction of the plastic film, air being able to emerge in the direction of the melt film via a continuous exit slot, generating a corresponding air velocity.

Since the melt film has a thicker edge, this must be pressed onto the chill roll with greater force. As a result, it is also necessary to pursue the objective of minimizing an inward step in the width of the film, that is to say to ensure that the width of the melt film remains as constant as possible during the plastic film production.

An apparatus forming the generic type has been disclosed by U.S. Pat. No. 4,255,365. The air knife disclosed by this apparatus has a multiplicity of air exit openings that are arranged in an offset manner in the longitudinal direction of the air knife and are directed onto the film web. This opens the possibility of producing different contact pressures over the length of the air knife, that is to say over the width of the plastic film web, in order ultimately to influence the thickness profile of the film.

However, in the case of this previously known apparatus, it is also necessary to use so-called "edge pipes" at the two edges of the film, in order to generate here in a deliberate way the higher contact pressure forces that are needed, matched to the respective film width. Finally, a design of this type is also only suitable for a specific width of a plastic film web.

It is therefore the object of the present invention to overcome the disadvantages according to the prior art, and to provide an apparatus improved in this regard for laying a plastic film on a roll, in particular for laying a polymer melt film on a chill roll.

SUMMARY OF THE INVENTION

According to the invention, it has been shown that, in particular in the case of higher take-off speeds, an offset, present in the take-off direction, of the effect lines of the exit openings of the air knife and of the means separately provided for blowing on the edge is disadvantageous. Such an offset of the effect lines of the means for blowing on the edge and of the blowing by the air knife has several disadvantages. It leads not only to distortion of the film, but also often causes markings on the film, especially in the edge region. As a result of the offset the effect lines in the prior art, it is often possible to detect blowing-in of the pressure air in the edge region between the roll and the film, as a result of which film edges that do not run quietly are produced, and the undesired turning up of the edges is possibly also favored. Finally, it is also possible to determine a mutual negative influence when adjusting the air knife and/or the means for blowing on the edge.

By contrast, according to the invention a joint, straight effect and laying line over the entire width of the film web, including the means for blowing on the edge, is made possible. As a result of this optimal, joint laying effect line, the risk present in the prior art of the occurrence of transverse markings on the film is reduced, and the risk of blowing in waste air in the edge region between roll and film is reduced. This also allows the most constant flat film edges to be achieved.

As an alternative, or in addition, provision is further made for the air knife to be adjustable in its longitudinal direction, that is to say with its effective width extending transversely to the plastic film web, that is to say in particular from the point of view of its effective air exit openings. This allows the laying-on width to be matched simply and precisely to the film width in an optimum way, in order in particular also by this means to avoid the lateral blowing in of air between roll and film, as a result of which the disadvantages mentioned above are eliminated. In this case, the slot width of the air exit opening in the air knife remains unchanged.

What has proven to be particularly advantageous is the width adjustment, performed transversely to the take-off direction, of the air knife in order to match it to the plastic film width given the presence of the device, integrated into the air knife, for blowing laterally on the edge, since as a result it is possible to realize a joint and simultaneous adjustment of the width of the blowing slot and hence the adaptation of the position of the means for blowing on the edge. In particular, it is possible to ensure by this means that the lateral blowing in of air between roll and film is reliably avoided.

In a development of the invention, provision is made for the device for blowing on the edge to be either implemented completely separately from the air-knife blowing, to be adjustable and hence controllable, or else for provision to be made for a smooth transition between the air streams, which are directed toward the foil, on the one hand in the region, that is to say in the central region, of the air knife and, on the other hand, in the edge regions for blowing on the edge.

BRIEF DESCRIPTION OF THE DRAWINGS FIGURES

The invention is explained below using drawings of different exemplary embodiments. Here, in detail:

FIG. 1: shows a schematic side view of the apparatus according to the invention;

FIG. 2: shows a schematic cross-sectional illustration through the air knife according to the invention;

FIG. 3: shows a perspective illustration of the one adjustable air-knife element;

FIG. 4: shows a schematic vertical sectional illustration of an extract in the longitudinal direction of the air knife, in the region of its chamber for blowing on the edge;

FIG. 5: shows a cross-sectional illustration along the line V—V in FIG. 4;

FIG. 6: shows a modification of FIG. 4; and

FIG. 7: shows a further exemplary embodiment modified in relation to FIG. 3.

DESCRIPTION OF A PREFERRED EMBODIMENT

Figure 1:
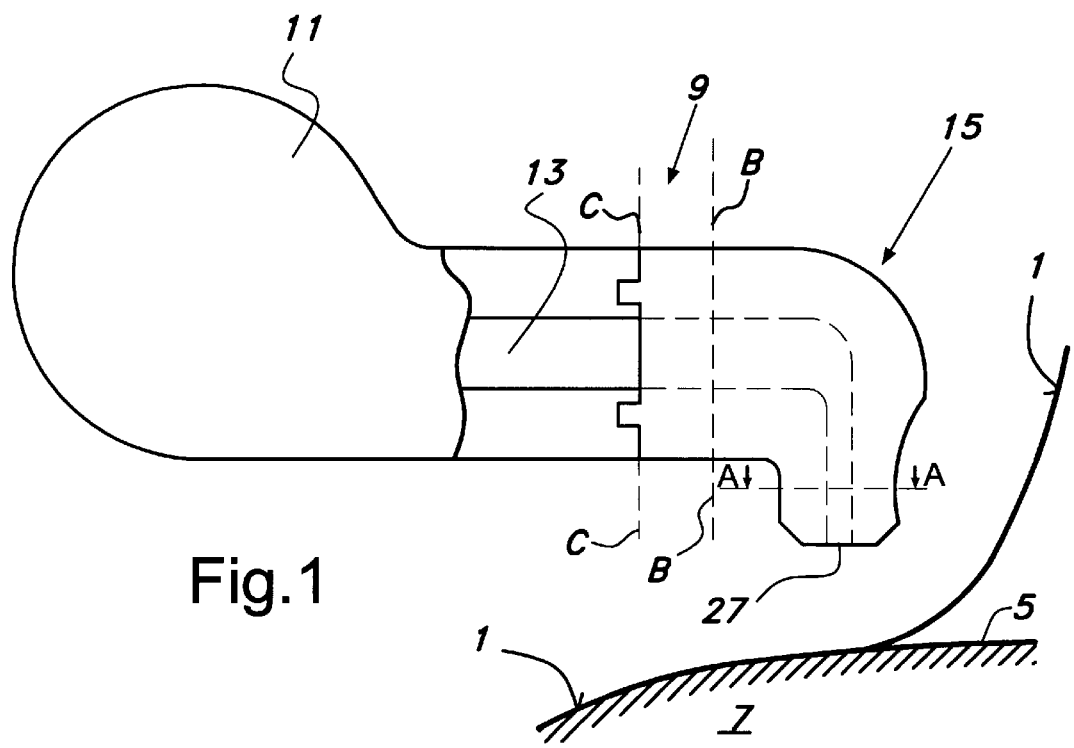

Illustrated in a schematic side view in FIG. 1 is a plastic film 1, in particular a polymer melt film 1, such as is laid, following the direction of the arrow 3, by a slot die onto a surface 5 (a section of which is shown in an axial front side view) of a roll 7, which is also referred to below as a chill roll.

In order to generate the necessary contact forces for laying the polymer melt film 1 onto the chill roll 7, an apparatus 9, which is intended to lay the polymer melt film on the chill roll and extends over the width of the polymer melt film 1, that is to say transversely to the take-off direction of the plastic film, is illustrated.

In its left-hand part illustrated in FIG. 1, this apparatus comprises an air distribution chamber 11, which is used for uniform air distribution. Adjoining this, via one or more connecting ducts 13, is a so-called air knife 15, which is explained in more detail using the following schematic drawing. In this case, the air knife extends in its longitudinal direction transversely to the plastic film 1, that is to say transversely to the take-off direction of the plastic film 1. To this extent, the effective width of the air-knife 15 is also spoken of below, that is to say the effective width related to the width of the plastic film.

According to the schematic cross-sectional illustration of FIG. 2, the air knife 15 essentially comprises two air-knife elements 15a and 15b. These air-knife elements 15a and 15b are of identical construction, at least in cross section, and essentially have an L-shaped configuration in the cross-sectional illustration according to FIG. 2. The two air-knife elements 15a and 15b are in this case arranged rotated through 180° with respect to each other, with the result that in each case the front wall 17 of the comparatively narrow-configuration short limb 19 of the inlet [sic] air knife 15 rests on the supporting wall 21, running transversely to the plastic film web 1, of the long limb 23 of the respective other air knife 15. This forms a chamber 25 that is closed in the circumferential direction and through which the air can flow at right angles to the plane of the drawing.

This results in a lower slot-shaped air exit opening 27.

Formed in each case on the air-knife element 15a and 15b, on which the relevant short limb 19 is also formed, are webs 29, which are wedge-shaped in the cross-sectional illustration and in each case are located offset inward toward the boundary wall of the shorter limb 19.

This arrangement results in a central chamber 31 that is essentially adjustable at least virtually over the entire width of the plastic film web 1, and outer chambers 33 for blowing on the edge, which are in each case located on the outside and separated from said central chamber 31 by the webs 29.

As emerges from the schematic perspective illustration according to FIG. 3, compressed air coming from the air distribution chamber 11 (FIG. 1) and also referred to below as blower air 35, can be fed from the rear side of the air knife 15 to the central chamber 31, this blower air 35, following the arrow 37 illustrated in FIG. 3, flowing out in the direction of the film via the central chamber 31, virtually over the entire width of the polymer melt film 1, via the lower air exit opening 27.

It can also be seen from FIG. 3 that the outer chambers 33 may possibly no longer be separated or offset from the central chamber 31 via said web 29, but also via a rear wall 39, so that high-pressure or compressed air 41 at higher pressure than the blower air 35 can be discharged via a separate feed duct 43, separately from the blower air, downward via the respective lateral feed duct 43 and the respective outer chamber 33, and downward via the lateral air exit openings 27', in accordance with the arrow illustration 42.

Since the two air-knife elements 15a, 15b, which are also referred to in part below as air-knife lips, can be displaced relative to one another in the longitudinal direction (that is to say transversely to the polymer melt film web 1) in accordance with the arrow illustration 44 in FIG. 2, the effective length of the central chamber 31 can be changed thereby. In spite of this displaceable arrangement of the air-knife lips 15a, 15b, the width for the means for blowing on the edge is kept constant, since the length of the outer chamber 33 remains unchanged. As a result of this arrangement, an optimum adaptation to the effective width of the polymer melt film width can be undertaken simply, a joint, straight contact and effect line for pressing the melt film 1 on the chill roll 7 always being produced. In this case, the pressure for producing higher contact forces at the edge of the melt film can be adjusted to an appropriate, desired level that is different from the pressure of the blower air, as a result of the separate feeding of compressed air.

Figure 4:
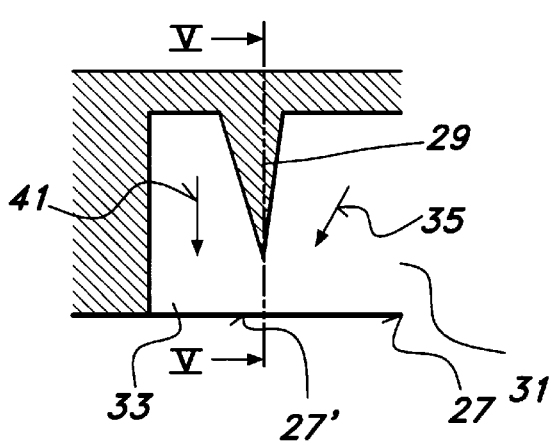

It can also be seen from the illustration according to FIGS. 3 and 4 that the webs 29 can also be arranged and shaped in such a way that no complete separation is effected between the central chamber 31 and the outer chambers 33. The effect of the design variant according to FIGS. 3 and 4 is that the compressed air 41 fed via the outer chambers 33, and the blower air 35 fed via the central chamber 31, mix before reaching the air exit gap 27 and 27' into the environment, which is located at the bottom, in order to achieve a smooth transition of the contact forces.

Figure 5:
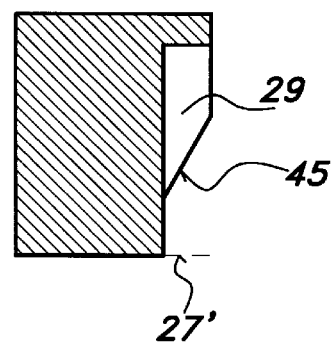

To this end, the webs 29 according to FIGS. 3 and 4 are not configured to run in a wedge shape in a cross-sectional plane parallel to the plastic film web (that is to say parallel to the lower air exit gap 27), but end alternatively in addition already above the plane of the air exit opening 27. In this case, according to the sectional illustration in FIG. 5, the front edge 45 of the web 29 is chamfered, with the result that, depending on the geometry selected, increasing mixing between compressed air and blower air takes place, the closer the two streams come to the air exit opening 27, 27'.

In order optionally to implement different outflow geometries, in particular also from the point of view of simple adaptation to different raw materials used, film thicknesses, plant speeds and/or other parameters, etc., provision can further be made that, in the outer chambers 33 or in the chamber formed as a whole by the air-knife elements 15a, 15b, it is possible to use different inserts, located on the outside, also compressed-air chamber inserts 33' below. The webs 29 thus become part of a replaceable insert, in order here to be able to undertake simple adaptation to different desired geometries.

The separation or displacement plane E between the two air-knife elements 15a and 15b in the schematic illustration of FIGS. 2 and 3 can, for example, be formed along the dashed line A—A or, for example, also B—B or C—C in FIG. 1 or another suitable point.

Using FIG. 6, and deviating from FIG. 4, it is only indicated that the geometry of the outer or high-pressure chamber 33 and/or of the web wall 29 can also be selected differently in adaptation to different plastic films, parameters, etc. for the purpose of optimization. In the case of the exemplary embodiment according to FIG. 6, the side walls are configured with an outwardly directed component in the flow direction. This can make it possible for the emerging high-pressure air to emerge from the air gap 27' not only with a flow component perpendicular to the plane of the plastic film, but also with an outwardly directed component pointing away from the plastic film central longitudinal line. The angle of inclination to the film web may be, for example, 0° to 45°, in particular 15° to 20°. Here, the replaceable inserts mentioned prove to be particularly beneficial, since in this way inserts with different geometries can be used at any time without problems.

Finally, using FIG. 7, it is merely indicated that, deviating from FIG. 2, the webs 29 are not arranged on the air-knife element 15a or 15b that is provided with the short limb 19, and hence moveable therewith, but on the respectively opposite air-knife element 15a or 15b. An adjustment in the longitudinal direction of the air knife and hence in the width action, related to the plastic film web, results from the fact that not only the effective length in the effective width of the central blower air chamber 25, but also the length in the effective width of the outer chambers 33, are differently adjustable.

I claim:

1. Apparatus for laying a polymer melt film web on a chill roll, comprising:

an air knife extending in its longitudinal direction transversely across the film web and transverse to a take-off direction for the film width, said air knife including one or more first air exit openings for flowing air under pressure toward the plastic film web in a direction having a flow component transverse to the film web, said air knife carrying discrete devices for flowing air through second exit openings onto opposite transverse edges of the plastic film web with air pressure and/or air velocity elevated with respect to the air pressure and/or velocity of the air flowing from said first exit openings, said devices forming an integral part of said air knife, said air knife being adjustable such that said first air exit openings are adjustable to provide different effective widths in the longitudinal direction of the air knife transversely to the take-off direction of the film web.

2. Apparatus according to claim 1 wherein the size of said second air exit openings remains unchanged when the length of said first air exit openings of the air knife is adjusted.

3. Apparatus according to claim 1 wherein said air knife comprises a central chamber for flowing air onto the middle of the plastic film through said first exit openings and at least two outer chambers on opposite sides of said central chamber for flowing air onto edges of the plastic film through said second exit openings.

4. Apparatus according to claim 1 wherein said air knife comprises at least two air knife elements each having a length dimension and a substantially L-shaped cross-section transverse to the air flow direction, said elements being juxtaposed with said L-shaped cross-sections in opposition to one another to define a closed air passage chamber between and generally parallel to the lengths of said L-shaped elements, the length of said chamber being adjustable by relative displacement of the two air knife elements in a direction generally parallel to their lengths.

5. Apparatus according to claim 3 wherein said outer chambers are each separated from said central chamber by a wall.

6. Apparatus according to claim 5 including a discrete high-pressure feed duct for supplying high-pressure air to said outer chambers at a pressure higher than the pressure of air supplied said central chamber.

7. Apparatus according to claim 5 wherein said walls are shaped to provide complete separation of the outer chambers from the central chamber.

8. Apparatus according to claim 5 wherein said walls are shaped to provide only partial separation between the outer chambers and the central chamber such that air introduced into the outer chambers at least partially mixes with at least part of the air introduced into the central chamber before flowing through the first and second air exit openings.

9. Apparatus according to claim 5 wherein said walls are aligned at an angle such that air flowing through said first exit openings of the outer chambers in the direction of the film web emerges with a flow component directed obliquely onto the plastic film edge and within a range of 0° to 45°.

10. Apparatus according to claim 9 wherein said outer chambers are shaped such that air flowing through said second openings flows with a flow component directed toward the film edge at an angle of 15° to 20°.

11. Apparatus according to claim 5 wherein said walls have a decreasing wall thickness in the direction of the air exit openings.

12. Apparatus according to claim 5 wherein the outer chambers including said walls comprise replaceable inserts.

13. Apparatus according to claim 1 wherein said air knife comprises a central chamber for flowing air onto the middle of the plastic film through said first exit openings and at least two outer chambers on opposite sides of said central chamber for flowing air onto edges of the plastic film through said second exit openings, said air knife comprising at least two air knife elements each having a length dimension and a substantially L-shaped cross-section transverse to the air flow direction, said elements being juxtaposed with said L-shaped cross-sections in opposition to one another to define said central chamber between and generally parallel to the lengths of said L-shaped elements, the length of said chamber being adjustable by relative displacement of the two air knife elements in a direction generally parallel to their lengths, said walls being arranged on the air knife elements forming said outer chambers.

14. Apparatus according to claim 1 wherein said air knife comprises a central chamber for flowing air onto the middle of the plastic film through said first exit openings and at least two outer chambers on opposite sides of said central chamber for flowing air onto edges of the plastic film through said second exit openings, said air knife comprising at least two air knife elements each having a length dimension and a substantially L-shaped cross-section transverse to the air flow direction, said elements being juxtaposed with said L-shaped cross-sections in opposition to one another to define said central chamber between and generally parallel to the lengths of said L-shaped elements, the length of said central chamber being adjustable by relative displacement of the two air knife elements in a direction generally parallel to their lengths, said outer chambers being adjustable in length in the longitudinal direction of the air knife by relative displacement of the two air knife elements and having outer boundary walls formed on respective air knife elements, and webs delimiting the outer chambers from the central chamber being seated on respective opposite air knife elements.

* * * * *